3,393,168
CROSSLINKED OLEFIN/MALEIC ANHYDRIDE INTERPOLYMERS

John H. Johnson, Kirkwood, Mo., assignor to Monsanto Company, St. Louis, Mo., a corporation of Delaware
No Drawing. Continuation-in-part of application Ser. No. 171,798, Feb. 8, 1962. This application Mar. 4, 1965, Ser. No. 437,278
The portion of the term of the patent subsequent to Jan. 12, 1982, has been disclaimed
29 Claims. (Cl. 260—29.7)

This application is a continuation-in-part of copending application Ser. No. 171,798, filed Feb. 8, 1962, now abandoned, which in turn is a continuation-in-part of Ser. No. 763,828, filed Sept. 29, 1958, now abandoned. This invention relates to cross-linked $C_2$–$C_4$ olefin and maleic acid anhydride interpolymers and salts thereof, and particularly to interpolymers of ethylene, propylene, n-butylene and/or isobutylene with maleic anhydride using an allyl ester of an olefinically unsaturated carboxylic acid as the cross-linking agent, and to aqueous dispersions of alkali, amine or ammonium salts thereof.

Many cross-linking agents are known for use in the production of cross-linked styrene-maleic anhydride polymers and others. U.S. 2,647,886 teaches a large number of cross-linking agents suitable for use with styrene and maleic anhydride comonomers. It appears from the teachings of this patent that any one of the cross-linking agents named therein as well as many not named would be suitable for cross-linking styrene and maleic anhydride in polymers.

Surprisingly, I have found that a number of bi-functional compounds which might be expected to be good cross-linking agents for $C_2$–$C_4$ olefins and maleic anhydride comonomers are not at all suitable especially for my particular purpose, namely for preparing interpolymers useful as thickeners for textile printing pastes. For example, the following bifunctional compounds were tested, using 1% by weight cross-linking agent based on reacting monomers and standardized polymerization conditions with ethylene and maleic anhydride comonomers: divinyl benzene, N,N-diallyl toluenesulfonamide, vinyl allyl ether, triallyl isocyanurate, diallyl cyanamide, triallyl cyanurate, and ethylene glycol dimethacrylate. None of these compounds proved to be effective or usable. It is most surprising that divinyl benzene which proved to be an excellent cross-linking agent for styrene and maleic anhydride comonomers as indicated in U.S. 2,647,886 gave no appreciable cross-linking with ethylene and maleic anhydride, resulting in a dimethylformamide soluble polymer even when the amount of divinyl benzene was increased above 2% based on reacting monomers. Ethylene glycol dimethylcrylate taught in this patent, as a cross-linking agent does not cross-link my product either.

Also, the following bifunctional compounds tested with propylene and maleic anhydride were found to be ineffective: divinyl carbitol, divinyl sulfone, vinyl allyl ether, N,N-methylene-bisacrylamide, and divinyl benzene. Again, divinyl benzene, which proved to be an evcellent cross-linking agent for styrene and maleic anhydride, gave no appreciable cross-linking with propylene and maleic anhydride. In other words, divinyl benzene and these other cross-linking agents which are indicated to be ineffective just do not cross-link either ethylene or propylene and maleic anhydride copolymers to any measurable extent. The results, of course, would be expected to be the same wherein the olefin comonomer was isobutylene or n-butylene.

It is a primary object of this invention to provide cross-linked $C_2$–$C_4$ olefin and maleic anhydride interpolymers usable in salt form as thickeners in textile printing paste.

These and other objects of the invention will become apparent as a detailed description of the invention proceeds.

Broadly the invention comprises reacting $C_2$–$C_4$ olefin with 1,2-dicarboxylic acid and their derivatives in the presence of the allyl ester cross-linking agent. The dicarboxylic acids can be maleic acid, fumaric acid, the mono- or dichloro-substituted maleic and fumaric acids, alkylated maleic and fumaric acids, mono and diphenyl maleic acids, benzyl maleic acid, dibenzyl maleic acid, ethyl maleic acid or any similar acids containing a double bond in the chain between the carboxyl groups such as mesaconic and citraconic acids. Acids where the double bond has shifted from the 1,2 position, such as itaconic and glutaconic acid can also be used. However, the anhydrides of each of the above acids capable of anhydride formation will normally be preferred rather than the acids.

More narrowly the interpolymers of the invention are formed by polymerizing a monomeric mixture of maleic anhydride and a $C_2$–$C_4$ olefin or olefin mixture using a cross-linking agent which is an allyl ester of an olefinically unsaturated carboxylic acid having from 3 to 24 carbon atoms in an amount in the range of about 0.1 mol percent and about 5 mol percent, preferably from about 0.3 mol percent to about 3 mol percent, based on reacting monomers. Normally with ethylene, it will be preferred that the interpolymer be produced using about 4:1 or higher molar ratio of ethylene to maleic anhydride even though they react to form the interpolymer in substantially a 1:1 molar ratio; however, the interpolymer can be made using a larger or smaller molar ratio. If the olefin is charged in a molar excess as compared to the maleic anhydride, the amount of the reacting monomers are easily calculated from the amount of maleic anhydride charged to the reaction vessel and the assumption that an equal molar amount of olefin reacts therewith. This assumption has proven to be true to a sufficiently close degree that no practical error results from this assumption.

As has been indicated, the interpolymers of the invention are formed from maleic anhydride and a $C_2$–$C_4$ olefin, i.e., ethylene, propylene, n-butylene, and isobutylene, using as a cross-linking agent an allyl ester of an olefinically unsaturated carboxylic acid having from 3 to 24 carbon atoms. An illustrative but non-limiting list of cross-linking agents is as follows: the allyl esters of acrylic acid, methacrylic acid, crotonic acid, isocrotonic acid, allylacetic acid, 2-pentenoic acid, 3-methyl-2-hexenoic acid, 2-hexenoic acid, 2-heptenoic acid, 4-ethyl-2-octenoic acid, 2-nonenoic acid, 9-decylenic acid, stillingic acid, 9-dodecylenic acid, palmitoleic acid, oleic acid, ricinoleic acid, petroselenic acid, vaccenic acid, linoleic acid, linolenic acid, eleostearic acid, licanic acid, parinaric acid, gadoleic acid, arachidonic acid, cetoleic acid, erucic acid, nervonic acid, etc. Other suitable allyl esters are the allyl or diallyl esters of unsaturated dicarboxylic acids, such as the following: allyl maleate, diallyl maleate, allyl fumarate, diallyl fumarate, allyl itaconate, diallyl itaconate, allyl citraconate, diallyl citraconate, allyl mesaconate, diallyl mesaconate, allyl glutaconate, diallyl glutaconate, etc.

For use as thickeners in textile printing pastes the interpolymers should be made using at least an amount of the cross-linking agent sufficient to make interpolymers which are substantially insoluble, i.e., at 2% polymer concentration do not form a clear solution but rather a thixotropic gel, in dimethylformamide at 25°C., and they are used as thickeners in the form of an alkali metal (i.e., sodium, potassium, lithium, rubidium, or cesium), amine and/or ammonium salts, forming a dilute swollen gel or dispersion in aqueous medium. When polymeric anhydrides are dissolved using ammonia or amine bases, an appreciable amount of amide groups are formed, resulting in mixed ammonium-amide or amine-amide polymeric salts, but if the anhydrides are first hydrolyzed to the acid before neutralization the salts will be preponderantly ammonium or amine salts. Mixtures of alkali metal and amine salts can, of course, also be used, if desired, and the mixed salts will be substantially equivalent to either alone.

The amines which are preferred are the lower alkyl primary and secondary amines such as methyl amine, dimethyl amine, ethyl amine, diethyl amine, the propyl amines, the di-propyl amines, n-hexyl amine, etc. However, longer chain amines such as stearyl or palmityl primary or secondary amines, etc., or even polyamines such as ethylenediamine or diethylenetriamine, etc., can be desirable for special uses. For comparison of properties, an arbitrarily selected 1½% by weight aqueous dispersion of the interpolymer salts having a pH in the range of about 3 to about 13 for alkali metal salts, preferably from 7 to about 12, is chosen, since these pH values represent the upper range of the viscosities associated with the approach to full neutralization of all carboxyls, but aqueous viscosities are still quite high and useful with the pH as low as 5. In the case of the ammonium/amide salts, viscosities are high in the range of about 3 to about 10 pH, but the preferred range is about 4 to about 9 pH. These 1½% weight dispersions in water of the salts for greatest efficiency as printing paste thickeners have a viscosity greater than 10,000 centipoise at 25° C., preferably greater than 20,000, and the viscosity can be greater than 100,000 centipoise at 25° C. Less of a higher molecular weight or higher cross-linked interpolymer salt is required for the printing paste, than if a lower molecular weight or lower cross-linked material is used. The salt can be used in aqueous dispersion in water in an amount of about between 0.1% and 15% by weight, preferably 0.25 to about 10%, in formulating the textile printing pastes. The pH range should be chosen to yield maximum useful viscosities in accordance with the particular base used and with consideration of the pH requirements and limitations of the particular system to be thickened.

Some types of coloring materials, such as pigments or dyes used for printing cotton, rayon, nylon and other fabrics, are already handled as high concentrations of the pigment (dye) dispersed in an inorganic solution of synthetic resin. They are applied by conventional means such as by rollers to the fabric in the form of a pigment-in-water emulsion. The emulsion is prepared by dispersing a petroleum solvent in an unpigmented resin solution called a "clear," e.g., see Example 4 of U.S. 2,364,692. My novel thickener in the salt form could, for example, be substituted for the ethyl cellulose of Example 4 of the patent with proper adjustment as to amount to compensate for differences in efficiency of thickening of these two different types of thickeners. The emulsion can be formed by mixing an aqueous dispersion of my salt with a petroleum solvent. However, it should be understood that my salts can be used as a print paste vehicle resin in a completely aqueous system without the petroleum solvent, particularly the higher cross-linked and/or higher molecular weight material. After application of the dye to the fabric, the fabric is dried and sometimes aged for color fastness. Aging and drying can be accomplished by steaming the fabric.

The novel cross-linked interpolymers or salts thereof are also useful as thickeners in fluids used in depleted oil wells to increase oil recovery by displacing oil from the oil sands. This process is referred to in the trade as "water-base fracturing." Normally these "water-base fracturing" fluids are used to carry sand into the formation to aid in the oil displacement. For this use the thickeners are especially effective in the form of hydrolyzed interpolymers or in the ammoniated form which would provide amide-ammonium salts of the interpolymers. To these "water-base fracturing" fluids, containing the novel thickeners of the invention, can be added fluid-loss or other additives, if desired. Acids such as HCl are normally used to break gels in the two-step process, wherein the acid is added after the gel is pumped into the formation. Rather than adding the agent to break the gel after pumping the gel into the formation, the gel-breaking agent can be incorporated in the field before it is pumped into the formation. In this latter case, however, the gel breaker must be slow acting and not break the gel until the fluid has been pumped into the formation. For example, sodium acid tetrametaphosphate can be a suitable gel-breaker for addition to fracturing fluids using my novel thickeners, since it will degrade slowly by scission to produce a very acid solution. Also, the salts of the half-amide half-acid form of the cross-linked interpolymers can be used as the thickener for oil drilling muds.

The novel interpolymers, the hydrolyzed products, and salts thereof, can be additionally used in the formation of various mucilaginous or colloidal gel applications such as dentifrices, talc suspensions used in making dental impressions, bread dough, surgical jellies, creams and ointments, bulk laxatives, generally as thickeners for aqueous systems (e.g. latex paints), carrying agent, ion-exchange resins and other materials for use in treatment of various disorders or the human and animal gastro-intestinal tract, etc. Also, they can be used as suspending agents for flocculation treatment of ores for concentration or beneficiation or mineral dressing, especially iron, uranium, rare earth metals and molybdenum ores, etc. A further use is in industrial or sewage waste waters for coagulation to clean up the water before dumping in a stream, e.g. paper mill waste water. Yet another use is to help suspend fines and improve uniformity of fibers in paper manufacture. For some of these uses the pH of the salt would be varied from substantially below 5 to substantially above 11, depending on the particular properties that may be desired.

In making the new interpolymer, conditions conventionally used in the preparation of olefin-maleic anhydride copolymers are suitable and peroxide catalysts are used in the polymerization. Preferred conditions fall within the range of about 0° to 100° C., preferably about 30° to about 100° C., and about 0 to about 600 p.s.i.g. depending on the particular olefin used. Radiation polymerization can also be used to produce the novel interpolymers, e.g., using such high-energy radiation sources as X-rays, γ-rays, neutrons, and the like. The reaction is preferably carried out in the presence of inert solvents such as ethylene dichloride. An aromatic hydrocarbon solvent like benzene is also a very satisfactory solvent for this reaction. A less preferred method of forming the new cross-linked olefin-maleic anhydride interpolymers is to add the cross-linking agent to the copolymer and carry out the cross-linking as a separate chemical reaction or polymerization step. It is rather preferred to add the cross-linking agents to the maleic anhydride and olefin comonomer during the initial polymerization step, since more stable and more improved interpolymers result.

The invention will be more clearly understood from the following detailed description of specific examples thereof:

EXAMPLE 1

A three liter rocking autoclave was charged with 267 grams of maleic anhydride, 2089 cc. of ethylene dichloride, and 3.71 grams of benzoyl peroxide polymerization catalyst. The autoclave (bomb) was pressured to 100 pounds per square inch gauge (p.s.i.g.) with ethylene, rocked at room temperature for about 10 minutes and the ethylene vented. This flushing operation was repeated once more to free the reaction mixture of dissolved air. The bomb was then charged with sufficient ethylene to give an estimated 300 p.s.i.g. on heating to the reaction temperature of 70° C. Rocking of the bomb was started and the temperature brought up to 70° C. by means of an electrically heated jacket. Additional ethylene was charged into the bomb from time to time to maintain the bomb pressure at approximately 300 p.s.i.g. After about 16 hours at 70° C., during which time the absorption of ethylene had ceased, unreacted ethylene was vented. The total reaction mixture was filtered, and the separated ethylene-maleic anhydride copolymer washed with ethylene dichloride while filtering. The polymer was dried at 108° C. for about 12 hours under the full vacuum of a water aspirator, and the yield of 1:1 copolymer of ethylene and maleic anhydride was 342 grams.

The specific viscosity of this copolymer was determined at 25° C. by modification of ASTM method D-445-446T, method B, using an Ostwald viscosimeter. The copolymer was dissolved in 1 weight percent concentration in dimethylformamide and the specific viscosity determined. The specific viscosity was 0.532 at 25° C.

Table I, which follows, summarizes the experiment discussed in detail above and also a number of other experiments which were carried out.

of cross-linking agent which is used, the greater will be the degree of cross-linking. It should be noted that all the experiments summarized in Table I were carried out in a similar manner to Example 1 and the other examples discussed in detail hereinbelow. Where the Brookfield viscosity is greater than 100,000 centipoise, the salts have been tested at the lower 1% concentration as indicated in the table, rather than the normal 1½% concentration. In Example 16, the bomb leaked some, otherwise it is believed that the Brookfield viscosity would have been higher.

EXAMPLE 4

The experiment of Example 4 was run in a substantially identical manner as that of Example 1, except for changes in conditions and reactor charges indicated as follows:

| | |
|---|---|
| Maleic anhydride _____ grams__ | 267 |
| Ethylene _____ p.s.i.g__ | 300 |
| Ethylene dichloride _____ cc__ | 2089 |
| Allyl crotonate _____ grams__ | 3.43 |
| Benzoyl peroxide _____ do____ | 3.48 |
| Temperature _____ ° C__ | 70 |

TABLE I

| Ex. No. | Cross Linking Agent | Wt. percent + (Mol percent) X-Link | Temp., ° C. | Press., p.s.i.g. | Spec. Vis. | Brookfield Visc. of 1½% aqueous suspension of sodium salt of polymer | |
|---|---|---|---|---|---|---|---|
| | | | | | | pH | Cp. |
| Ethylene—Maleic Anhydride | | | | | | | |
| 1 | | 0 | 70 | 300 | 0.532 | | |
| 2 | Allyl methacrylate | 1 (0.5) | 70 | 300 | | 10.0 | 8,600 |
| 3 | do | 2 (1.0) | 60 | 450 | | 10.15 10.8 | 61,800 [1]34,400 |
| 4 | Allyl crotonate | 1 (0.5) | 70 | 300 | | 9.75 | 7,600 |
| 5 | do | 2 (1.0) | 60 | 450 | | 10.15 10.20 | 100,000 [1]79,200 |
| 6 | Allyl acrylate | 1 (0.56) | 70 | 300 | | 9.5 | 3,000 |
| 7 | do | 2 (1.12) | 60 | 450 | | 10.4 9.43 | 100,000 [1]100,000 |
| 8 | Diallyl maleate | 1 (0.32) | 70 | 300 | | | 1,200 |
| 9 | Monoallyl itaconate | 1 (0.37) | 70 | 300 | | 11.9 | 15,600 |
| 10 | Diallyl itaconate | 1 (0.30) | 70 | 300 | | 11.4 | 19,400 |
| Propylene—Maleic Anhydride | | | | | | | |
| 11 | | 0 | 70 | 100 | 0.756 | | |
| 12 | Allyl crotonate | 1 (0.56) | 70 | 100 | | | ([2]) |
| Isobutylene—Maleic Anhydride | | | | | | | |
| 13 | | 0 | 80 | ([3]) | 2.754 | | |
| 14 | Allyl acrylate | 1 (0.69) | 80 | ([3]) | | 11.6 | 36,000 |
| 15 | Allyl methacrylate | 1 (0.61) | 80 | ([3]) | | 11.5 | 63,200 |
| 16 | Allyl crotonate | 1 (0.61) | 80 | ([3]) | | 11.0 | 1,200 |

[1] 1%.
[2] A Brookfield viscosity was not run on this material, but a qualitative examination of the cross-linked copolymer indicated cross-linking.
[3] The pressure in these runs was autogenous.

A few general conclusions can be reached by examining these data of Table I. It is seen that the various cross-linking agents will be operable in different degrees of efficiency depending upon the olefin which is copolymerized with maleic anhydride. Of course, all the allyl esters of the olefinically unsaturated carboxylic acids having 3 to 24 carbon atoms will be operable as cross-linking agents in varying degrees with the olefin-maleic anhydride copolymers. This is contrasted to divinyl benzene and a number of other compounds which might be expected to be good cross-linking agents, but which are not operable at all, as cross-linking agents with these olefin and maleic anhydride comonomers. Generally speaking, the molecular weight of the interpolymers formed and/or degree of crosslinking decreases with increasing temperature and increases with increasing pressure. This is borne out by the data of Table I. Also, the larger the amount The amount of allyl crotonate represents 1% by weight, 0.50 mol percent, based on reacting monomers, the reaction time was about 15½ hours, and the yield of product polymer was 344 grams.

A specific viscosity determination was attempted on the polymer produced in Example 4, but it was found that 1% of this polymer formed an insoluble gel in dimethylformamide, so no specific viscosity determination was possible.

A sample of the polymer of Example 4 was added to sufficient water containing sodium hydroxide to make up a 1½% concentration of the polymer in water, the sodium hydroxide having been added in sufficient amount to neutralize the maleic anhydride copolymer, forming substantially the disodium salts of the polymer and giving a pH of 9.75. The resulting dispersion of the polymer salt in water was tested for viscosity with a Brookfield viscosimeter using a number 4 spindle at 6 r.p.m. The viscosity of the dispersion was 7,600 centipoise at room temperature (about 25° C.).

EXAMPLE 5

In a substantially identical manner to Example 4, the following experiment was carried out, except for changes in conditions and reactor charges, indicated as follows:

| | | |
|---|---|---|
| Maleic anhydride | grams__ | 267 |
| Ethylene | p.s.i.g__ | 450 |
| Ethylene dichloride | cc__ | 2089 |
| Allyl crotonate | grams__ | 6.86 |
| Benzoyl peroxide | do____ | 3.48 |
| Temperature | ° C__ | 60 |

The amount of allyl crotonate represents 2% by weight, 1.0 mol percent, based on reacting monomers, the reaction time was about 19 hours, and the yield of product polymer was 340 grams.

As in Example 4, an attempted specific viscosity determination using 1% of the product polymer in dimethylformamide resulted in an insoluble gel, so no specific viscosity determination could be made.

In a similar manner so that described in Example 4, a 1½% dispersion of the sodium salt of the polymer in water was prepared, having a pH of 10.15. A Brookfield viscosity determination of this aqueous dispersion gave a viscosity greater than 100,000 centipoise at 25° C., the exact viscosity not being determinable since it was outside the range of the particular instrument used. Viscosity determinations were made at a lower concentration of 1%, giving 79,200 centipoise at pH 10.2. The much higher specific viscosity polymer produced in this example resulted from the use of a higher pressure, a lower temperature and twice the amount of cross-linking agent used in Example 4.

EXAMPLE 12

In a substantially identical manner to Example 4, the following experiment was carried out, except for changes in conditions and reactor charges indicated as follows:

| | | |
|---|---|---|
| Maleic anhydride | grams__ | 196 |
| Propylene | p.s.i.g__ | 100 |
| Benzene | cc__ | 1600 |
| Allyl crotonate | grams__ | 2.8 |
| Benzoyl peroxide | do____ | 2.47 |
| Temperature | ° C__ | 70 |

The amount of allyl crotonate represents 1% by weight, 0.56 mol percent, based on reacting monomers, the reaction time was about 19 hours, and the polymer yield was 269 grams.

As in Example 4, an attempted specific viscosity determination using 1% of the product polymer in dimethylformamide resulted in an insoluble gel, so no specific viscosity determination could be made. A qualitative examination of the product indicated cross-linking, but a Brookfield viscosity was not run.

EXAMPLE 15

In a substantially identical manner to Example 4, the following experiment was carried out except for changes in conditions and reactor charges indicated as follows:

| | | |
|---|---|---|
| Maleic anhydride | grams__ | 196 |
| Isobutylene | do____ | 123 |
| Benzene | cc__ | 1600 |
| Allyl methacrylate | grams__ | 3.08 |
| Benzoyl peroxide | do____ | 0.64 |
| Temperature | ° C__ | 80 |
| Pressure, autogenous. | | |

The amount of allyl methacrylate represents 1% by weight, 0.61 mol percent, based on reacting monomers, the reaction time was about 19 hours, and the polymer yield was 298 grams.

As in Example 4, an attempted specific viscosity determination using 1% of the product polymer in dimethylformamide resulted in an insoluble gel, so no specific viscosity determination could be made.

In a similar manner so that described in Example 4, a 1½% dispersion of the sodium salt of the polymer in water was prepared, having a pH of 11.5. A Brookfield viscosity determination of this aqueous dispersion gave a viscosity of 63,200 centipoise at room temperature (about 25° C.).

EXAMPLE 17

In a substantially identical manner to Example 4, the following experiment is carried out, except for changes in conditions and reactor charges indicated as follows:

| | | |
|---|---|---|
| Maleic anhydride | grams__ | 267 |
| Ethylene | p.s.i.g__ | 450 |
| Benzene | cc__ | 2089 |
| Benzoyl peroxide | grams__ | 3.48 |
| Allyl linolenate | do____ | 8.66 |
| Temperature | ° C__ | 60 |
| Reaction time | hours__ | 18 |

The amount of allyl linolenate represents 2.68% by weight, 0.50 mol percent, based on reacting monomers.

The polymer product obtained forms an insoluble gel at 1% concentration in dimethylformamide, so no specific viscosity determination can be made. The effectiveness of allyl linolenate as a cross-linking agent is determined using the Brookfield viscosimeter method described in Example 4.

EXAMPLE 18

Samples of the disodium salts of three of the polymers were prepared and isolated in a manner which is described below. The three salts which were isolated were the disodium salts of the polymers of Examples 3, 5 and 7. A 5.2 g. sample of each of the polymers of the three examples were added to separate 418 g. portions of water and to each of these mixtures was added 77 cc. of 1 N sodium hydroxide. These mixtures with sodium hydroxide were then tumbled (agitated) overnight at room temperature on a rotating wheel. The next morning the solutions were each observed to be thick gels. The disodium salts were isolated by pouring the gels into an excess of acetone. The salts are insoluble in acetone and precipitate from the mixture. The isolated salts were in each instance dried in a circulating air oven at 110° C., and were recovered as a white flaky product. The original polymer samples contain little or no sodium (only traces as are normally present in many things), as shown by a platinum wire flame test. The isolated salts each gave strong sodium flame tests. Each of these isolated salts was then made up as approximately 1.5% solutions in water. They each produced thick gels with little or no flow at room temperature. These solid cross-linked sodium salts are suitable directly for use in thickening aqueous and glycerine systems. Specific applications for which these salts are useful include textile print paste thickener, latex thickener, clay beneficiation and water fracturing in secondary oil recovery.

Although the invention has been described in terms of specific examples, which are set forth in considerable detail, it should be understood that this is by way of illustration only and that the invention is not necessarily limited thereto since alternative improvement and operating techniques will become apparent to those skilled in the art in view of the disclosure. Accordingly, modifications are contemplated which can be made without departing from the spirit of the described invention.

What is claimed is:

1. A salt selected from the class consisting of alkali metal, ammonium/amide, amine/amide, ammonium and amine salts of a cross-linked interpolymer of substantially equimolar portions of maleic anhydride and an olefin having from 2 to 4 carbon atoms, and a cross-linking agent which is an allyl ester of an olefinically unsaturated carboxylic acid having from 3 to 24 carbon atoms in an amount in the range of about 0.1 mol percent to about 5 mol percent based on reacting monomers.

2. The salt of claim 1, wherein said cross-linking agent is present in an amount of between 0.3 mol precent and about 3 mol percent.

3. The salt of claim 2, which is an alkali metal salt.

4. The salt of claim 2, which is an ammonium/amide salt.

5. The salt of claim 4, wherein said cross-linking agent is allyl crotonate.

6. The salt of claim 4 wherein said cross-linking agent is allyl acrylate.

7. A salt selected from the class consisting of alkali metal, ammonium/amide, amine/amide, ammonium and amine salts of a cross-linked interpolymer of substantially equimolar portions of maleic anhydride and an olefin having from 2 to 4 carbon atoms, and a cross-linking agent which is an allyl ester of an olefinically unsaturated carboxylic acid having from 3 to 24 carbon atoms in at least an amount sufficient to make said interpolymer substantially insoluble in dimethylformamide at 25° C. but not more than 5 mol percent based on reacting monomers.

8. The salt of claim 7, which is a sodium salt.

9. The salt of claim 8, wherein said olefin is ethylene and said cross-linking agent is allyl crotonate.

10. The salt of claim 8, wherein said olefin is ethylene and said cross-linking agent is allyl methacrylate.

11. The salt of claim 8 wherein said olefin is ethylene and said cross-linking agent is allyl acrylate.

12. A composition of matter comprising an aqueous dispersion of about 0.1% to about 15% by weight of a salt selected from the class consisting of alkali metal, ammonium/amide, amine/amide, ammonium and amine salts of a cross-linked interpolymer of substantially equimolar portions of maleic anhydride and an olefin having from 2 to 4 carbon atoms, and a cross-linking agent which is an allyl ester of an olefinically unsaturated carboxylic acid having from 3 to 24 carbon atoms in an amount in the range of about 0.1 mol percent to about 5 mol percent based on reacting monomers.

13. The composition of claim 12, wherein said salt is present in an amount of between about 0.25% to about 10% by weight, said cross-linking agent is present in an amount of between 0.3 mol percent and about 3 mol percent.

14. The composition of claim 13, wherein the pH is in the range of about 3 to about 13 and said salt is an alkali metal salt.

15. The composition of claim 13, wherein the pH is in the range of about 3 to about 10, and said salt is an ammonium/amide salt.

16. The composition of claim 15, where said olefin is ethylene and said cross-linking agent is allyl acrylate.

17. The composition of claim 15 wherein said olefin is ethylene and said cross-linking agent is allyl achrylate.

18. A composition of matter comprising an aqueous dispersion of about 0.1 to about 15% of a salt selected from the class consisting of alkali metal, ammonium/amide, amine/amide, ammonium and amine salts of a cross-linked interpolymer of substantially equimolar portions of maleic anhydride and an olefin having from 2 to 4 carbon atoms, and a cross-linking agent which is an allyl ester of an olefinically unsaturated carboxylic acid having from 3 to 24 carbon atoms in at least an amount sufficient to make said interpolymer substantially insoluble in dimethylformamide at 25° C., but not more than 5 mol percent based on reacting monomers.

19. The composition of claim 18, wherein said salt is a sodium salt present in an amount of between about 0.25 and about 10%, and the pH is in the range of about 7 to about 12.

20. The composition of claim 19 wherein said olefin is ethylene and said cross-linking agent is allyl acrylate.

21. The composition of claim 19, wherein said olefin is ethylene and said cross-linking agent is allyl crotonate.

22. The composition of claim 19, wherein said olefin is ethylene and said cross-linking agent is allyl methacrylate.

23. A method of printing textile fabric which comprises treating said fabric with a printing paste comprising a coloring material and an aqueous dispersion of about 0.1% to about 15% of a salt selected from the class consisting of alkali metal, ammonium/amide, amine/amide, ammonium and amine salts of a cross-linked interpolymer of substantially equimolar portions of maleic anhydride and an olefin having from 2 to 4 carbon atoms, and a cross-linking agent which is an allyl ester of an olefinically unsaturated carboxylic acid having from 3 to 24 carbon atoms in at least an amount sufficient to make said interpolymer substantially insoluble in dimethylformamide at 25° C. but not more than 5 mol percent based on reacting monomers.

24. The method of claim 23, wherein said salt is a sodium salt, said olefin is ethylene, and said cross-linking agent is allyl crotonate.

25. The method of claim 23, wherein said salt is a sodium salt, said olefin is ethylene, and said cross-linking agent is allyl acrylate.

26. A cross-linked interpolymer comprising substantially equal molar portions of maleic anhydride and an olefin having from 2 to 4 carbon atoms, and a cross-linking agent which is an allyl ester of an olefinically unsaturated aliphatic carboxylic acid having from 3 to 24 carbon atoms in at least an amount sufficient to make said interpolymer substantially insoluble in dimethylformamide at 25° C.

27. An interpolymer of claim 26 wherein the cross-linking agent is allyl acrylate.

28. An interpolymer of claim 26 wherein said cross-linking agent is allyl methacrylate.

29. An interpolymer of claim 26 wherein said cross-linking agent is allyl crotonate.

References Cited
UNITED STATES PATENTS

| | | | |
|---|---|---|---|
| 2,378,629 | 6/1945 | Hanford | 260—78.5 |
| 2,977,334 | 3/1961 | Zopf et al. | 260—78.5 |
| 3,165,486 | 1/1965 | Johnson | 260—78.5 |
| 1,976,679 | 10/1934 | Fikentscher et al. | |
| 2,626,945 | 1/1953 | Carlin | 260—78.5 |
| 2,923,692 | 2/1960 | Ackerman et al. | 260—78.5 |

SAMUEL H. BLECH, *Primary Examiner.*

M. TILLMAN, *Examiner.*

J. ZIEGLER, *Assistant Examiner.*